(12) United States Patent
Takamiya

(10) Patent No.: US 8,955,499 B2
(45) Date of Patent: Feb. 17, 2015

(54) EXHAUST GAS RECIRCULATION DEVICE

(75) Inventor: Fumio Takamiya, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/983,889

(22) PCT Filed: Feb. 10, 2011

(86) PCT No.: PCT/JP2011/000759
§ 371 (c)(1),
(2), (4) Date: Aug. 6, 2013

(87) PCT Pub. No.: WO2012/107960
PCT Pub. Date: Aug. 16, 2012

(65) Prior Publication Data
US 2013/0312715 A1 Nov. 28, 2013

(51) Int. Cl.
*F02M 25/07* (2006.01)
*F02D 41/04* (2006.01)
*F02D 41/00* (2006.01)
*F02B 29/04* (2006.01)

(52) U.S. Cl.
CPC ....... *F02M 25/0726* (2013.01); *F02M 25/0724* (2013.01); *F02M 25/0727* (2013.01); *F02M 25/0731* (2013.01); *F02D 41/042* (2013.01); *F02M 25/0743* (2013.01); *F02M 25/0745* (2013.01); *F02D 41/005* (2013.01); *Y02T 10/121* (2013.01); *F02B 29/0406* (2013.01); *F02M 25/0707* (2013.01); *F02D 41/0077* (2013.01)
USPC .................. 123/568.12; 123/568.2

(58) Field of Classification Search
CPC ........ F02M 25/0745; F02M 25/0726–25/0737
USPC .............................. 123/568.12, 568.2, 568.21
See application file for complete search history.

(56) References Cited

U.S. PATENT DOCUMENTS

| | | | |
|---|---|---|---|
| 6,250,073 B1 | 6/2001 | Zimmer et al. | |
| 2008/0257316 A1* | 10/2008 | Modien et al. | 123/568.2 |
| 2010/0211292 A1* | 8/2010 | Geyer et al. | 701/108 |
| 2011/0289914 A1* | 12/2011 | Afjeh | 60/602 |
| 2012/0159948 A1* | 6/2012 | Moroi et al. | 60/602 |
| 2012/0180479 A1* | 7/2012 | Beil et al. | 60/605.2 |

FOREIGN PATENT DOCUMENTS

| | | |
|---|---|---|
| JP | A-2005-325811 | 11/2005 |
| JP | A-2007-262902 | 10/2007 |
| JP | A-2008-298023 | 12/2008 |

\* cited by examiner

*Primary Examiner* — Erick Solis
(74) *Attorney, Agent, or Firm* — Oliff PLC

(57) ABSTRACT

An exhaust gas recirculation system according to the present invention includes an EGR passage for introducing a part of exhaust gas emitted from an engine to an intake passage, the EGR passage communicating at one end thereof with the intake passage whereas at the other end thereof with an exhaust passage, an EGR control valve for controlling the flow rate of the exhaust gas flowing therein, the EGR control valve being disposed at one end of the EGR passage, an on-off valve for opening or closing the EGR passage, the on-off valve being disposed at the other end of the EGR passage, and a heat exchanger for cooling the exhaust gas introduced to the EGR passage, the heat exchanger) being disposed nearer the other end of the EGR passage than the on-off valve.

4 Claims, 3 Drawing Sheets

EXHAUST GAS RECIRCULATION DEVICE

TECHNICAL FIELD

The present invention relates to an exhaust gas recirculation system capable of adding a part of exhaust gas to intake air so as to suppress the production amount of emission, that is, nitrogen oxide.

BACKGROUND ART

There has been known an EGR (Exhaust Gas Recirculation) system that returns a part of exhaust gas flowing in an exhaust passage to a combustion chamber through an intake passage, and then, decreases the combustion temperature of an air-fuel mixture staying inside of the combustion chamber, so as to reduce the ratio of nitrogen oxide to the exhaust gas. In this EGR system, an EGR control valve capable of opening or closing an EGR passage is interposed in the EGR passage communicating with the intake passage and the exhaust passage at both ends thereof, thereby recirculating the exhaust gas toward the intake passage in a predetermined operational region.

In recent years, a social demand for purification of exhaust gas has been remarkably escalating. From this point of view, the operation of an internal combustion engine is stopped during the halt of a vehicle, thus suppressing waste consumption of fuel, and further, preventing waste emission of carbon dioxide at the same time, that is, promoting an idle stopping control. However, there is no effective exhaust gas at the EGR passage when the internal combustion engine is started again during the idle stopping control, and therefore, it is difficult to contain the exhaust gas in the intake air that is supplied to the combustion chamber together with the fuel at the beginning of the start.

Patent Literature 1 has proposed a technique for solving the above-described problem. Specifically, EGR gas is temporarily reserved in an EGR passage at the time of the stoppage of an internal combustion engine during idle stopping control, and then, the EGR gas can be supplied to one cylinder that initially burns fuel to be first supplied, in particular, has been burnt as well as the intake air when the internal combustion engine is started again.

CITATION LIST

Patent Literature

PTL 1: Japanese Patent Laid-open No. 2007-262902

SUMMARY OF THE INVENTION

Technical Problem

Patent Literature 1 discloses that a heat exchanger for cooling the EGR gas so as to supply it at high densities is incorporated in the EGR passage. Therefore, uncooled exhaust gas also is temporarily reserved in the EGR passage, thereby causing the inhibition of the high density. In the state in which the exhaust gas is temporarily reserved, water contained in the exhaust gas staying in the heat exchanger is condensed, to react with a sulfur component contained in the exhaust gas to form a sulfuric acid that corrodes the heat exchanger, so as to markedly shorten the product lifetime of the heat exchanger.

An object of the present invention is to provide an exhaust gas recirculation system capable of enhancing the high density of exhaust gas to be supplied to intake air when an internal combustion engine is temporarily stopped, and then, is started again. The object of the present invention encompasses also providing an exhaust gas recirculation system capable of suppressing a heat exchanger from being corroded as water contained in temporarily reserved exhaust gas is condensed.

Solution to Problem

An exhaust gas recirculation system according to an aspect of the present invention comprises an EGR passage for introducing a part of exhaust gas emitted from an internal combustion engine to an intake passage, the EGR passage communicating at one end thereof with an intake passage whereas at the other end thereof with an exhaust passage, an EGR control valve for controlling the flow rate of the exhaust gas flowing in the EGR passage, the EGR control valve being disposed at one end of the EGR passage, an on-off valve for opening or closing the EGR passage, the on-off valve being disposed at the other end of the EGR passage, and a heat exchanger for cooling the exhaust gas introduced to the EGR passage, wherein the heat exchanger is disposed nearer the other end of the EGR passage than the on-off valve.

In the present invention, a part of the exhaust gas passes the heat exchanger according to the pressure inside of the exhaust passage, and then, is cooled into a high density state, to be thus mixed with the intake air passing the intake passage by the EGR control valve. At a stop request for the internal combustion engine, the EGR control valve closes the EGR passage, and further, closes the on-off valve, so that the exhaust gas according to the difference between the pressure of the intake passage and the pressure of the exhaust passage is temporarily reserved in the EGR passage between the EGR control valve and the on-off valve. In this case, the exhaust gas temporarily reserved in the EGR passage is cooled in a high density by the heat exchanger. In the case where the internal combustion engine is requested to be started in this state, the EGR control valve is immediately opened, so that the high-density exhaust gas is introduced to the intake passage, to be thus mixed with the intake air flowing therein. After the EGR control valve is opened, the temporarily reserved exhaust gas is consumed, that is, the on-off valve is switched to the valve opened state together with the outflow to the intake passage, and thus, the on-off valve returns to an open state before the stop request for the internal combustion engine.

In the exhaust gas recirculation system according to the present invention, it is effective to design the volume of the EGR passage between the EGR control valve and the on-off valve so as to correspond to a displacement of the internal combustion engine. Moreover, the exhaust gas recirculation system may further comprise means for increasing the pressure of the exhaust gas introduced to the EGR passage.

Advantageous Effects of the Invention

According to the present invention, the heat exchanger is disposed nearer the other end of the EGR passage than the on-off valve, and therefore, the high-density exhaust gas after passing the heat exchanger and being cooled can be temporarily held between the EGR control valve and the on-off valve. Consequently, when the internal combustion engine is started again, the exhaust gas temporarily reserved in the EGR passage can be introduced to the combustion chamber, thereby further suppressing the emission. Additionally, the inside of the heat exchanger can be kept in a state continuously communicating with the exhaust passage even if the on-off valve is closed, thereby reducing an adverse influence on the exhaust gas caused by the condensation of steam in the exhaust gas, so as to suppress the corrosion of the heat exchanger from advancing as possibly as in the conventional exhaust gas recirculation system without an on-off valve.

In the case where the volume of the EGR passage between the EGR control valve and the on-off valve corresponds to the displacement of the internal combustion engine, it is possible to contain the exhaust gas temporarily reserved in the EGR passage in the intake air to be supplied to each of the cylinders together with the fuel when the internal combustion engine is started again. As a consequence, the emission can be more securely reduced.

In the case where the exhaust gas recirculation system further includes the means for increasing the pressure of the exhaust gas introduced to the EGR passage, the pressure of the exhaust gas temporarily reserved in the EGR passage between the EGR control valve and the on-off valve can be readily increased. Consequently, it is possible to more accurately perform the EGR control when the internal combustion engine is started again.

DESCRIPTION OF EMBODIMENTS

An embodiment in which an exhaust gas recirculation system according to the present invention is applied to a compression ignition type internal combustion engine will be explained in detail with reference to FIGS. 1-3. However, the present invention is not limited to the embodiment and the construction thereof may be freely modified according to characteristics required for targets to which the present invention can be applied. The present invention is effectively applied to, for example, a spark ignition type internal combustion engine in which gasoline, alcohol, LNG (Liquefied Natural Gas), or the like is used as fuel to be ignited by a spark plug.

Figure 1:
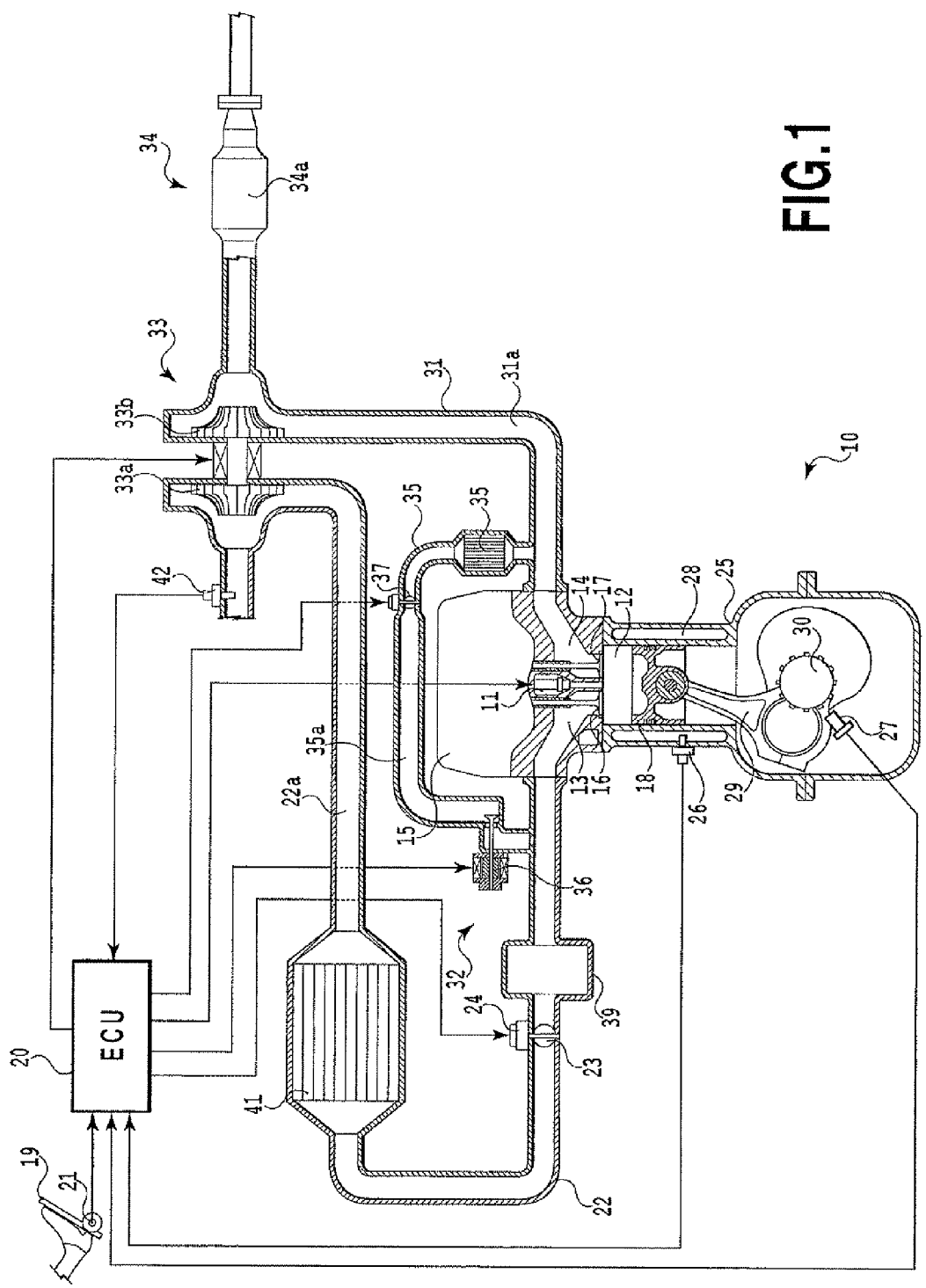
FIG. 1 is a conceptual diagram illustrating an embodiment in which an exhaust gas recirculation system according to the present invention is applied to a compression ignition type internal combustion engine.
Figure 2:
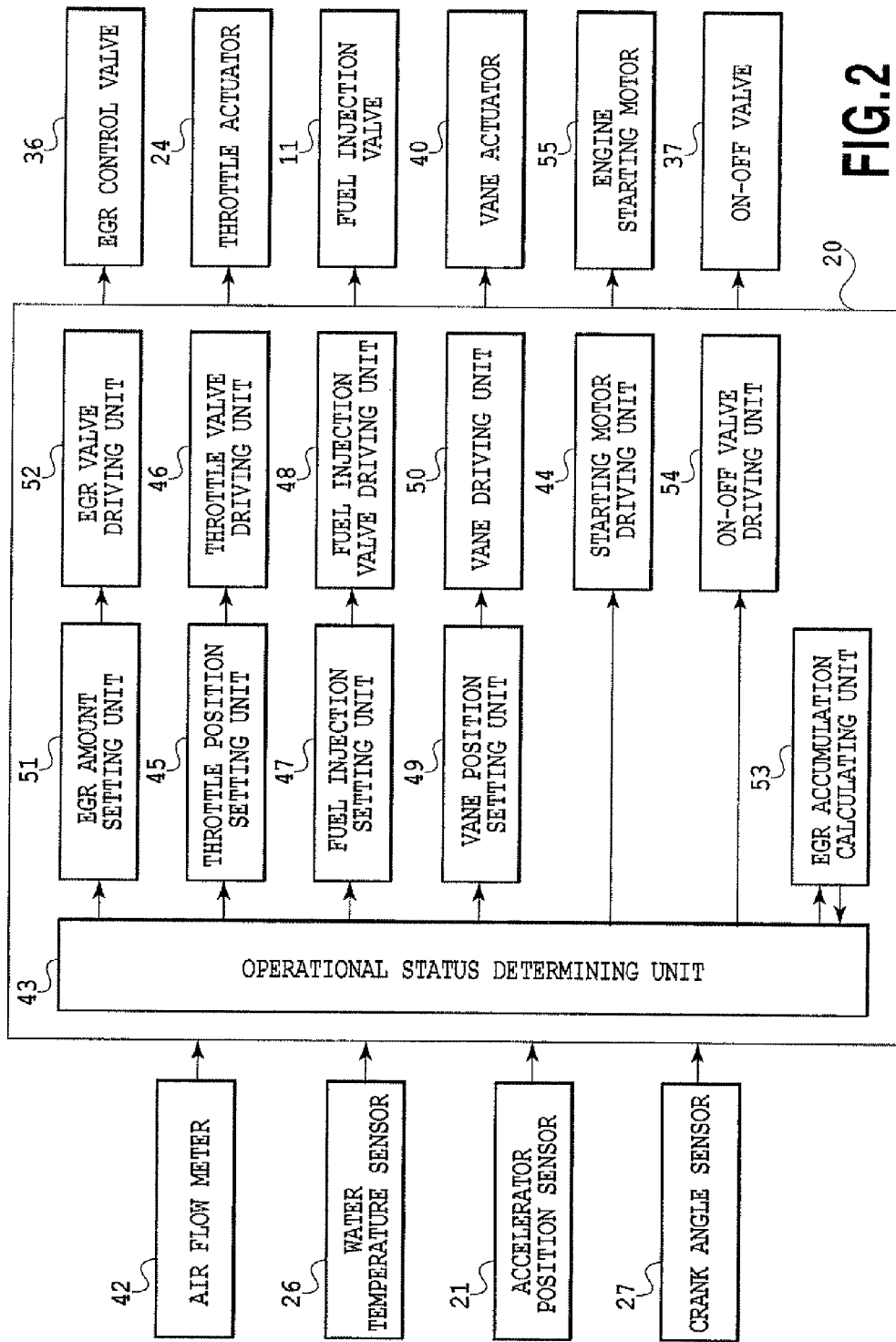
FIG. 2 is a control block diagram schematically illustrating the embodiment illustrated in FIG. 1.

FIG. 1 illustrates the conception of an engine system in the present embodiment, and FIG. 2 illustrates a control block in the engine system. Specifically, an engine 10 in the present embodiment is a compression ignition type multi-cylinder internal combustion engine in which light oil as fuel is directly injected into a combustion chamber 12 in a compressed state from a fuel injection valve 11, to achieve the spontaneous ignition of the fuel. However, it should be noted that the present invention may be applied to a single-cylinder internal combustion engine.

A cylinder head 15 having an intake port 13 and an exhaust port 14 exposed to the combustion chamber 12 formed therein incorporates therein a valve-operating mechanism, not shown, and the above-described fuel injection valve 11.

The valve-operating mechanism in the present embodiment includes an intake valve 16 for opening/closing the intake port 13 and an exhaust valve 17 for opening/closing the exhaust port 14. The valve-operating mechanism can change the opening/closing timings of the intake valve 16 and exhaust valve 17 according to the operational status of the engine 10. Alternatively, a valve-operating mechanism that fixes the opening/closing timings of the intake valve 16 and exhaust valve 17 may be also adopted.

The fuel injection valve 11 is arranged to be exposed to the upper center of the combustion chamber 12 in such a manner as to be held between the intake valve 16 and the exhaust valve 17. The fuel injection valve 11 in the present embodiment is of a single direct injection type for directly injecting light oil as fuel immediately before a compression stroke, that is, only immediately before the compression top dead center of a piston 18. However, in addition to the fuel injection in the compression stroke, it is possible to adopt a fuel injection valve of a multiple injection type that injects fuel also on the way of an intake stroke in order to produce a more uniform air-fuel mixture or a fuel injection valve of a port injection type that injects the fuel into the intake port 13.

The quantity and injection timing of the fuel to be supplied into the combustion chamber 12 from the fuel injection valve 11 are controlled by an ECU (Electronic Control Unit) 20 based on a vehicular operational status including the position of an accelerator pedal 19 by a driver. The position of the accelerator pedal 19 is detected by an accelerator position sensor 21, and then, the detection information is output to the ECU 20.

A throttle valve 23 for adjusting the opening degree of an intake passage 22a is incorporated in an intake conduit 22 that is connected to the cylinder head 15 in such a manner as to communicate with the intake port 13 and defines the intake passage 22a together with the intake port 13. The position of the throttle valve 23 is controlled via a throttle actuator 24 by the ECU 20 based on the vehicular operational status including the position of the accelerator pedal 19.

A water temperature sensor 26 and a crank angle sensor 27 are mounted to a cylinder block 25 in which the piston 18 reciprocates. The water temperature sensor 26 detects the temperature of cooling water flowing in a water jacket 28 formed in the cylinder block 25 in such a manner as to surround the combustion chamber 12, and outputs the detection result to the ECU 20. The crank angle sensor 27 detects the rotational phase, that is, the crank angle of a crankshaft 30 connected with the piston 18 via a connecting rod 29, and outputs the detection result to the ECU 20. The ECU 20 judges the need for a warming operation based on the information from the water temperature sensor 26, and further, calculates the rotational phase of the crankshaft 30 or an engine speed in real time based on the information from the crank angle sensor 27.

The engine 10 incorporates therein an EGR system 32 for introducing a part of the exhaust gas flowing in an exhaust passage 31a to the intake passage 22a, an exhaust turbocharger 33, and an exhaust purifying device 34.

The EGR device 32 intending to reduce nitrogen oxide contained in the exhaust gas or enhance fuel economy is provided with an EGR conduit 35 defining an EGR passage 35a, an EGR control valve 36 and an on-off valve 37 that are spaced at the EGR conduit 35, and a heat exchanger 38. The EGR conduit 35 communicates at one end thereof with the exhaust conduit 31 defining the exhaust passage 31a together with the exhaust port 14, and further, communicates at the other end thereof with the intake passage 22 between the aforementioned throttle valve 23 and a surge tank 39 arranged downstream of the throttle valve 23. The EGR control valve 36 which is disposed at one end of the EGR conduit 35 in the proximity of a connecting portion of the intake conduit 22 with the EGR conduit 35 and whose operation is controlled by the ECU 20 controls the flow rate of the exhaust gas recirculated from the EGR passage 35a toward the intake passage 22a based on the vehicular operational status. The on-off valve 37 disposed at a connecting portion of the exhaust conduit 31 with the EGR conduit 35 is adapted to simply open or close the EGR passage 35a, wherein its switching operation is controlled by the ECU 20. In the present embodiment, the distance between the EGR control valve 36 and the on-off valve 37 and the inner diameter of the EGR passage 35a therebetween are appropriately set such that the volume of the EGR passage 35a partitioned by the closed EGR control valve 36 and the closed on-off valve 37 becomes substantially equal to the displacement V of the engine 10. The heat exchanger 38 for reducing the temperature of the exhaust gas flowing in the EGR passage 35a is disposed at the other end of the EGR conduit 35, that is, at the EGR conduit 35 between the connecting portion of the exhaust conduit 31 with the EGR conduit 35 and the on-off valve 37. To the heat exchanger is introduced the cooling water flowing in the water jacket 28 formed at the cylinder block 25. Hence, the high-temperature exhaust gas is efficiently cooled, thus enhancing the filling efficiency of the EGR gas to be introduced to the EGR passage 35a.

The exhaust turbocharger (hereinafter simply referred to as a turbocharger) 33 is adapted to increase the amount of intake air to the combustion chamber 12 by utilizing the kinetic energy of the exhaust gas flowing in the exhaust passage 31a so as to enhance the filling efficiency of the intake air. The turbocharger 33 includes a compressor 33a and a turbine 33b to be rotated integrally with the compressor 33a as essential component parts. The compressor 33a is incorporated in the intake conduit 22 positioned upstream of the throttle valve 23. The turbine 33b is incorporated in the exhaust conduit 31 connected to the cylinder head 15 in such a manner as to communicate with the exhaust port 14. The turbine 33b in the present embodiment is provided with variable vanes, not shown, whose open degree is controlled by the ECU 13 via a vane actuator 40 (see FIG. 2) based on the vehicular operational status. In other words, the vane actuator 40 is operated to change the position of the variable vanes, and therefore, the utilizing efficiency of the kinetic energy of the exhaust gas is changed, resulting in a change in filling efficiency of the intake gas. In the present embodiment, the variable vanes and vane actuator 40 of the turbine 33b of the turbocharger 33 are used as means according to the present invention for increasing the pressure of the exhaust gas introduced to the EGR passage.

Incidentally, in order to decrease the temperature of the intake air heated by heat conducted from the turbine 33b exposed to the high-temperature exhaust gas via the compressor 33a, an intercooler 41 is incorporated in the intake passage 22a between the compressor 33a and the surge tank 39. Moreover, an air flow meter 42 for detecting the flow rate of the intake air flowing in the intake passage 22a and for outputting the detection result to the ECU 20 is disposed in the intake conduit 22 upstream of the compressor 33a of the turbocharger.

The exhaust purifying device 34 for rendering harmless the harmful substance produced by the combustion of the air-fuel mixture inside of the combustion chamber 12 is disposed in the exhaust conduit 31 defining the exhaust passage 31a downstream of the turbine 33b of the turbocharger 33. The exhaust purifying device 34 in the present embodiment includes at least an oxidation catalytic converter 34a, and further, may additionally include a DPF (Diesel Particulate Filter) or another catalytic converter such as a $NO_x$ catalyst.

In this manner, the intake gas to be supplied into the combustion chamber 12 together with the exhaust gas recirculated into the intake passage 22a via the EGR passage 35a forms an air-fuel mixture with the fuel injected into the combustion chamber 12 from the fuel injection valve 11. The mixture is burned by spontaneous ignition immediately before the compression top dead center of the piston 18, and then, the exhaust gas generated by the combustion is emitted from the exhaust conduit 31 to the atmosphere through the exhaust purifying device 34. In this case, $CO_2$ contained in the intake air decreases the combustion temperature of the air-fuel mixture, thereby suppressing the amount of nitrogen oxide produced by the combustion of the air-fuel mixture.

Here, in the case of an engine stopping request during the operation of the vehicle, high-pressure EGR gas is reserved in the EGR passage 35a, the fuel is stopped from being supplied from the fuel injection valve 11, and then, the engine 10 is stopped till an engine starting request. At the engine starting request, the fuel is supplied again from the fuel injection valve 11 to the combustion chamber 12 in the engine 10. At this time, the EGR control valve 36 is opened, so that the EGR gas reserved in the EGR passage 35a is added to the intake air flowing in the intake passage 22a. Consequently, the EGR control can be performed after the initial combustion at the time of the engine restart. Incidentally, "the engine stopping request" according to the present invention signifies the state in which the position of the accelerator pedal 19 becomes zero and the vehicle speed becomes zero during the operation of the engine 10, like the idling state of a vehicle. In contrast, "the engine starting request" according to the present invention signifies the state in which the accelerator pedal 19 is depressed by a driver so as to start the vehicle after the engine 10 is stopped at "the engine stopping request".

The ECU 20 grasps the operational statuses of the engine 10 and the vehicle having the engine 10 mounted thereon based on the detection information output from the accelerator position sensor 21, the water temperature sensor 26, the crank angle sensor 27, the air flow meter 42, and the like. And then, the ECU 20 controls the operations of the fuel injection valve 11, the throttle valve 23, the EGR control valve 36, the variable vanes, the on-off valve 37, and the like in such a manner that the engine 10 is smoothly operated in accordance with preset programs. In view of this, the ECU 20 in the present embodiment further includes an operational status determining unit 43, a starting motor driving unit 44, a throttle position setting unit 45, a throttle valve driving unit 46, a fuel injection setting unit 47, a fuel injection valve driving unit 48, a vane position setting unit 49, a vane driving unit 50, an EGR amount setting unit 51, an EGR valve driving unit 52, an EGR accumulation calculating unit 53, and an on-off valve driving unit 54.

The operational status determining unit 43 judges the operational statuses of the vehicle and the engine 10 based on the detection information output from the accelerator position sensor 21, the water temperature sensor 26, the crank angle sensor 27, the air flow meter 42, and the like. In other words, the operational status determining unit 43 also determines whether or not there is an engine stopping request or an engine starting request.

The starting motor driving unit 44 controls the operation of an engine starting motor 55 (see FIG. 2) connected to the crankshaft 30 via a coupler, not shown, in response to an ON signal output from an ignition key switch, not shown, and the foregoing engine starting request. The engine starting motor 55 drives the engine 10.

The throttle position setting unit 45 sets an optimum throttle position that has been previously set, based on the position of the accelerator pedal 19 detected by the accelerator position sensor 21 or the operational status of the vehicle.

The throttle valve driving unit 46 controls the throttle valve 23 at the position set by the throttle position setting unit 45 via the throttle actuator 24.

The fuel injection setting unit 47 sets the drive torque of the engine 10, that is, the injection quantity of fuel injected by the fuel injection valve 11, and its injection timing in response to the detection signal output from the accelerator position sensor 21. The fuel injection valve driving unit 48 drives the fuel injection valve 11 such that the fuel is injected in the fuel injection quantity set by the fuel injection setting unit 47 at the set injection timing.

In the case where the operational status determining unit 43 in the ECU 20 determines that the vehicle having the engine 10 mounted thereon is in the previously set EGR operational region, the EGR amount setting unit 51 sets the EGR amount to be recirculated into the combustion chamber 12 according to the operational status of the vehicle at this time, that is, the position of the EGR control valve 36. The EGR valve driving unit 52 controls the EGR control valve 36 at the position set by the EGR amount setting unit 51: otherwise, the EGR valve driving unit 52 basically closes the EGR control valve 36 so as to close the EGR passage 35a. Also at the engine stopping request, the EGR control valve 36 is held in a closed state.

The vane position setting unit 49 sets the vane position of the turbine 33b of the turbocharger 33 based on the engine speed or the operational status of the vehicle. The vane driving unit 50 drives the variable vanes via the vane actuator 40 such that the variable vanes have the vane position set by the vane position setting unit 49. Incidentally, at the engine stopping request, the opening degree of the variable vanes is reduced to the minimum, and then, the exhaust pressure of the exhaust passage 31a upstream of the turbine 33b of the turbocharger 33 is increased, thus introducing the exhaust gas of a high pressure to the EGR passage 35a. The variable vanes are returned to the maximum opening position at the timing when the engine 10 is temporarily stopped at the engine stopping request. In contrast, a rapid response is taken into consideration at the engine starting request.

The EGR accumulation calculating unit 53 calculates the amount $G_e$ of EGR gas accumulated in the EGR passage 35a at the engine stopping request, and then, inputs the calculation result to the operational status determining unit 43. More specifically, the flow rate $G_e$ of the exhaust gas emitted from the engine 10 is calculated after the EGR control valve 36 closes the EGR passage 35a, and further, the vane actuator 40 closes the variable vanes of the turbine 33b.

The on-off valve driving unit 54 controls the opening/closing of the on-off valve 37 in accordance with a preset program at the previous engine stopping request or engine starting request. More specifically, when the exhaust gas flow rate $G_e$ calculated by the EGR accumulation calculating unit 53 at the engine stopping request is greater than the displacement V of the engine 10, the on-off valve 37 is closed. In contrast, the on-off valve 37 is switched to be fully opened in the case where the fuel combustion is completed by all of the cylinders at the engine starting request.

Figure 3:
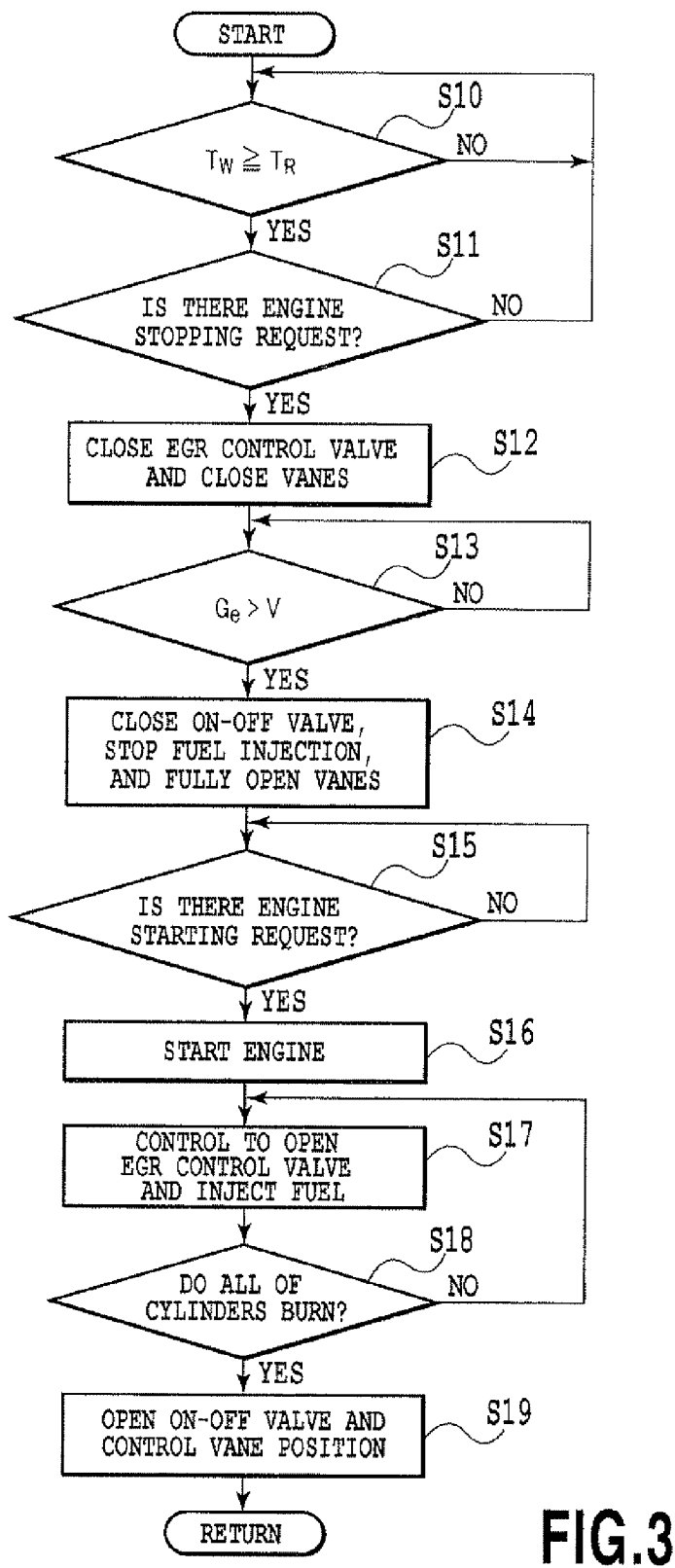
FIG. 3 is a flowchart schematically illustrating the control routine of the exhaust gas recirculation system in the embodiment illustrated in FIG. 1.

The procedures relating to the EGR control in the above-described embodiment follow the flowchart illustrated in FIG. 3. Specifically, first in step S10, it is determined whether or not the temperature $T_W$ of the cooling water in the engine 10, detected by the water temperature sensor 26 is a threshold $T_R$ or higher. Step S10 is repeated until the temperature $T_W$ of the cooling water in the engine 10 becomes the threshold $T_R$ or higher. It is undesirable that the control is transited to the EGR control during the warming of the engine 10 and the unstable combustion, and therefore, the threshold $T_R$ is the lowest value of the temperature of the cooling water, at which the EGR control can be smoothly performed. This temperature is generally set to about 80° C.

In step S10, if it is determined that the temperature $T_W$ of the cooling water is the threshold $T_R$ or higher, that is, the EGR control can be smoothly performed, the control routine proceeds to step S11, in which it is determined whether or not there is an engine stopping request. Here, if it is determined there is no engine stopping request, the control routine returns to step S10, and then, the above-described procedures are repeated.

In contrast, if it is determined in step S11 that there is an engine stopping request, the control routine proceeds to step S12, in which the EGR control valve 36 is closed, and further, the opening degree of the variable vanes is reduced to the minimum. Consequently, the exhaust gas pressure at the exhaust passage 31a upstream of the turbine 33b is temporarily increased, and thus, the exhaust gas having the higher pressure flows in the EGR passage 35a. Under this condition, step S12 is executed, and then, it is determined whether or not the flow rate $G_e$ of the exhaust gas introduced to the exhaust passage 31a exceeds a predetermined rate, that is, the engine displacement V in the present embodiment. Step S13 is repeated until the flow rate $G_e$ of the exhaust gas introduced to the exhaust passage 31a exceeds the engine displacement V.

If it is determined in step 313 that the flow rate $G_e$ of the exhaust gas introduced to the exhaust passage 31a exceeds the engine displacement V, that is, the sufficient amount of high-pressure EGR gas flows in the EGR passage 35a, the control routine proceeds to step S14. In step S14, the on-off valve 37 is closed, and further, the fuel injection from the fuel injection valve 11 is stopped, thereby temporarily stopping the engine 10, and further, returning the variable vanes from the fully closed state to the fully open state. Here, the EGR gas reserved in the EGR passage 35a between the EGR control valve 36 and the on-off valve 37 is partitioned from the heat exchanger 38. As a consequence, it is possible to prevent such inconvenience that water contained in the EGR gas reserved in the EGR passage 35a between the EGR control valve 36 and the on-off valve 37 is condensed, and then, its water droplets adhere onto the inner wall of the EGR conduit 35.

Thereafter, the control routine proceeds to step S15, in which it is determined whether or not there is an engine starting request. Step S15 is repeated until there is an engine starting request. If it is determined in step S15 that there is an engine starting request, the control routine proceeds to step S16, in which the engine is started, that is, the engine starting motor 55 is driven, so that the engine is driven. Subsequently, in step S17, the EGR control valve 36 is opened so as to perform the EGR control, and further, the fuel is injected from the fuel injection valve 11, and thus, the engine 10 being driven is turned into the operational state. Next, it is determined in step S18 whether or not all of the cylinders burn the fuel. Steps S17 and S18 are repeated until all of the cylinders burn the fuel.

In this manner, if it is determined in step S18 that all of the cylinders burn the fuel, the on-off valve 37 is turned to a released state so as to introduce again the exhaust gas from the exhaust passage 31a to the EGR passage 35a in step S19. That is to say, the normal EGR control according to the operational status of the vehicle is performed by the EGR control valve 36. In addition, the position of the variable vanes of the turbine 33b is changed from the fully closed state to a normally controlled state according to the operational status of the vehicle.

In this manner, when the engine 10 is changed again to the operational status based on the start request by the engine 10, the EGR control valve 36 is operated such that the high-pressure EGR gas reserved in the EGR passage 35a can be contained in the intake air flowing in the intake passage 22a. As a consequence, the EGR control can be securely performed with respect to the cylinder that first burns the fuel, thereby further reducing the amount of nitrogen oxide.

It is noted that the present invention should be interpreted only based on the matters recited in claims. In the above-described embodiment, all alterations and modifications included in the idea of the present invention can be achieved in addition to the described matters. That is to say, all of the matters in the above-described embodiment are not adapted to limit the present invention, but can be arbitrarily changed according to the usage, the object, and the like, including every construction irrelevant to the present invention.

LIST OF REFERENCE NUMERALS 10 engine
11 fuel injection valve
12 combustion chamber
13 intake port
14 exhaust port
15 cylinder head
16 intake valve
17 exhaust valve
18 piston
19 accelerator pedal
20 ECU
21 accelerator position sensor
22 intake conduit
22a intake passage
23 throttle valve
24 throttle actuator
25 cylinder block
26 water temperature sensor
27 crank angle sensor
28 water jacket
29 connecting rod
30 crankshaft
31 exhaust conduit
31a exhaust passage
32 EGR device
33 exhaust turbocharger
33a compressor
33b turbine
34 exhaust purifying device
34a oxidation catalytic converter
35 EGR conduit
35a EGR passage
36 EGR control valve
37 on-off valve
38 heat exchanger
39 surge tank
40 vane actuator
41 intercooler
42 air flow meter
43 operational status determining unit
44 starting motor driving unit
45 throttle position setting unit
46 throttle valve driving unit
47 fuel injection setting unit
48 fuel injection valve driving unit
49 vane position setting unit
50 vane driving unit
51 EGR rate setting unit
52 EGR valve driving unit
53 EGR accumulation calculating unit
54 on-oft valve driving unit
55 engine starting motor
V engine exhaust gas amount
$G_e$ exhaust gas flow rate

The invention claimed is:

1. An exhaust gas recirculation system comprising:
an EGR passage for introducing a part of exhaust gas to be emitted from an internal combustion engine to an intake passage, the EGR passage communicating at one end thereof with the intake passage whereas at the other end thereof with an exhaust passage;
an EGR control valve for controlling the flow rate of the exhaust gas flowing in the EGR passage, the EGR control valve being disposed at one end of the EGR passage;
an on-off valve for opening or closing the EGR passage with the EGR control valve, the on-off valve being disposed at the other end of the EGR passage; and
a heat exchanger for cooling the exhaust gas introduced to the EGR wherein:
the heat exchanger is disposed nearer the other end of the EGR passage than the on-off valve, and
the exhaust gas according to a difference between a pressure of the intake passage and a pressure of the exhaust passage is temporarily reserved in the EGR passage between the EGR control valve and the on-off valve.

2. The exhaust gas recirculation system as claimed in claim 1, wherein the volume of the EGR passage between the EGR control valve and the on-off valve corresponds to a displacement of the internal combustion engine.

3. The exhaust gas recirculation system as claimed in claim 1, further comprising means for increasing the pressure of the exhaust gas introduced to the EGR passage.

4. The exhaust gas recirculation system as claimed in claim 2, further comprising means for increasing the pressure of the exhaust gas introduced to the EGR passage.

* * * * *